March 6, 1928.
A. B. BROLUSKA
1,661,461
CASING FOR PNEUMATIC TUBES
Filed April 6, 1923
3 Sheets-Sheet 2
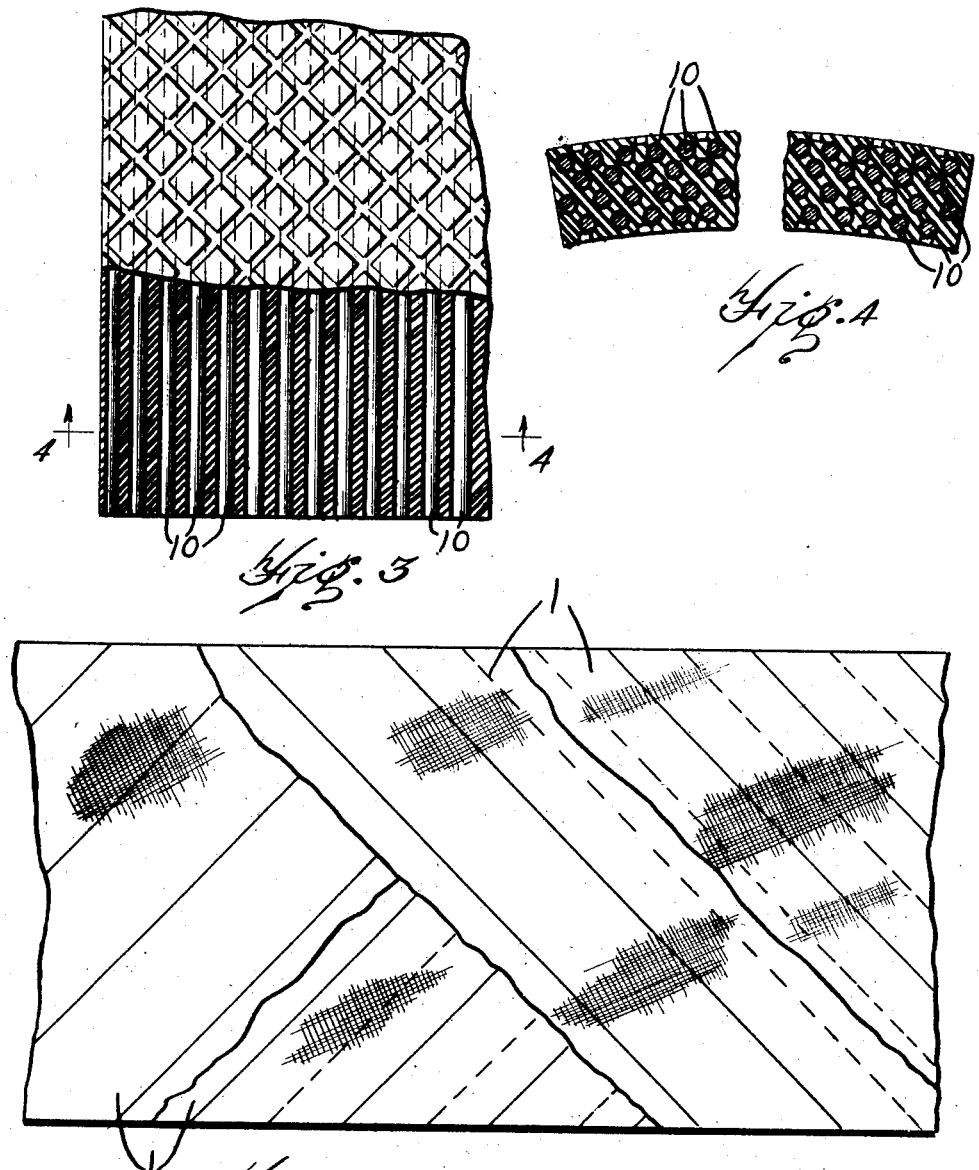
INVENTOR.
Amel B. Broluska
BY
ATTORNEY.

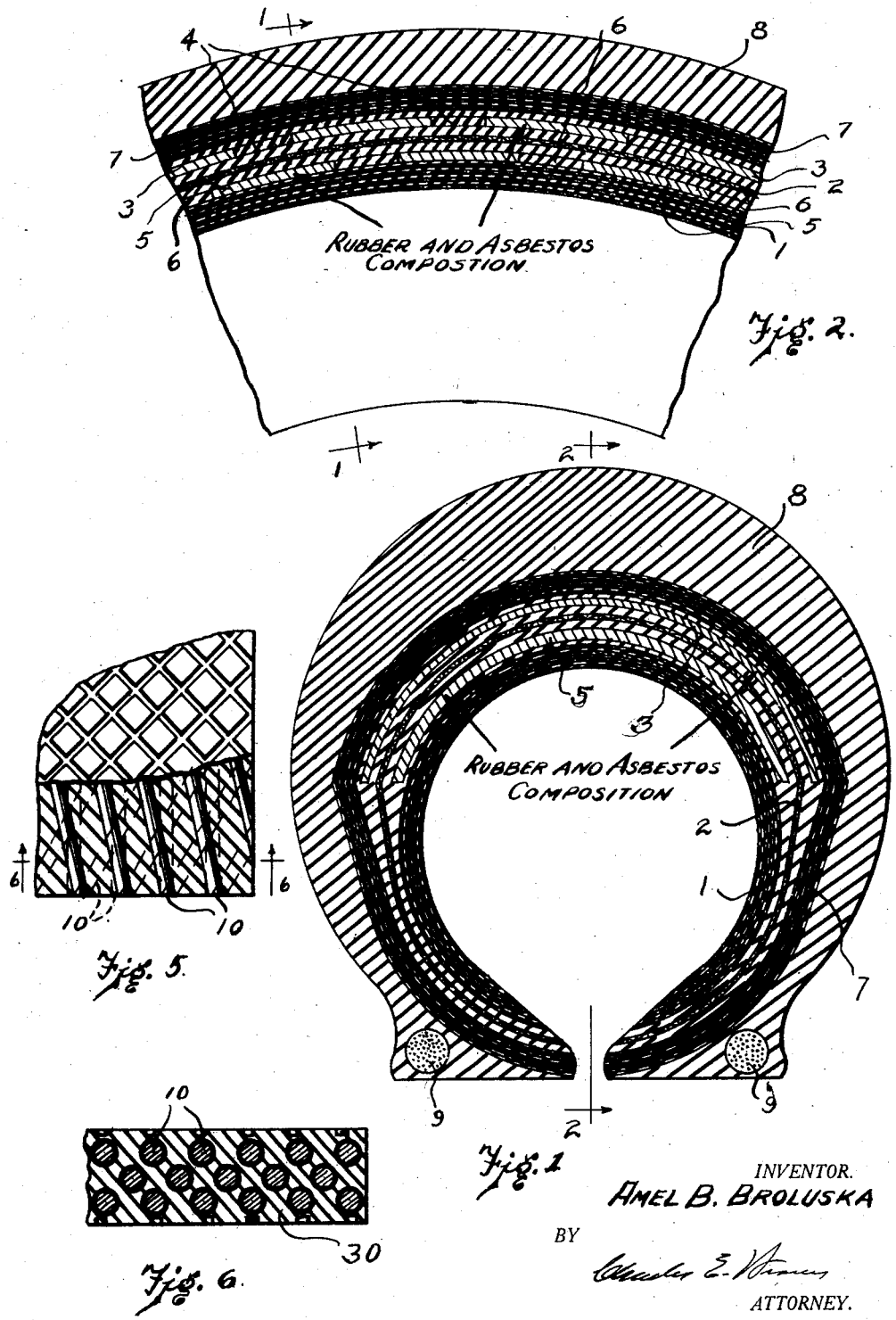

March 6, 1928.

A. B. BROLUSKA 1,661,461

CASING FOR PNEUMATIC TUBES

Filed April 6, 1923

INVENTOR.
AMEL B. BROLUSKA.

BY

ATTORNEY.

Patented Mar. 6, 1928.

1,661,461

UNITED STATES PATENT OFFICE.

AMEL B. BROLUSKA, OF DETROIT, MICHIGAN.

CASING FOR PNEUMATIC TUBES.

Application filed April 6, 1923. Serial No. 630,231.

This invention relates to casings for penumatic tubes, and the object of the invention is to provide a strong resilient casing which is puncture proof and which, at the same time, is comparatively inexpensive to manufacture. Another object of the invention is to provide a casing comprising a series of flexible puncture proof plates arranged in staggered relation so that the plates overlap, the said plates being held out of contact one with the other by the method of construction. Another object of the invention is to provide a series of puncture proof plates embedded in the casing formed of vulcanizable material containing reinforcements, the said material being placed under pressure and vulcanized to form a puncture proof plate and the plates being then vulcanized in the casing to form an integral part thereof. Another object of the invention is to provide a casing having puncture resisting plates utilized in the construction thereof, the said plates being vulcanized in the said casing and being prevented from breaking from the adjacent portions of the casing. Previous to this time attempts have been made to make a puncture proof tire by embedding metal discs or plates in the tire but, as these plates cannot be vulcanized in the tire structure and are not sufficiently flexible, they become loose in the casing and eventually cut and destroy the casing. By providing puncture proof plates which are as flexible as the body of the casing these difficulties are done away with and a tire of the usual appearance having inherent puncture proof qualities is provided. These objects and the several novel features of the invention are hereinafter more fully described and claimed, and the preferred form of construction by which these objects are attained is shown in the accompanying drawings in which—

Fig. 1 is a section through a tire embodying my invention.

Fig. 2 is a section taken on line 2—2 of Fig. 1.

Fig. 3 is an enlarged elevation of a portion of one of the puncture resisting plates partly broken away to show the construction.

Fig. 4 is a section taken on line 4—4 of Fig. 3.

Fig. 5 is a view similar to Fig. 3 showing an alternative arrangement of the reinforcements.

Fig. 6 is a section taken on line 6—6 of Fig. 5.

Fig. 7 is a view showing the manner in which the cords or fabric is positioned in the tire.

Figure 9:
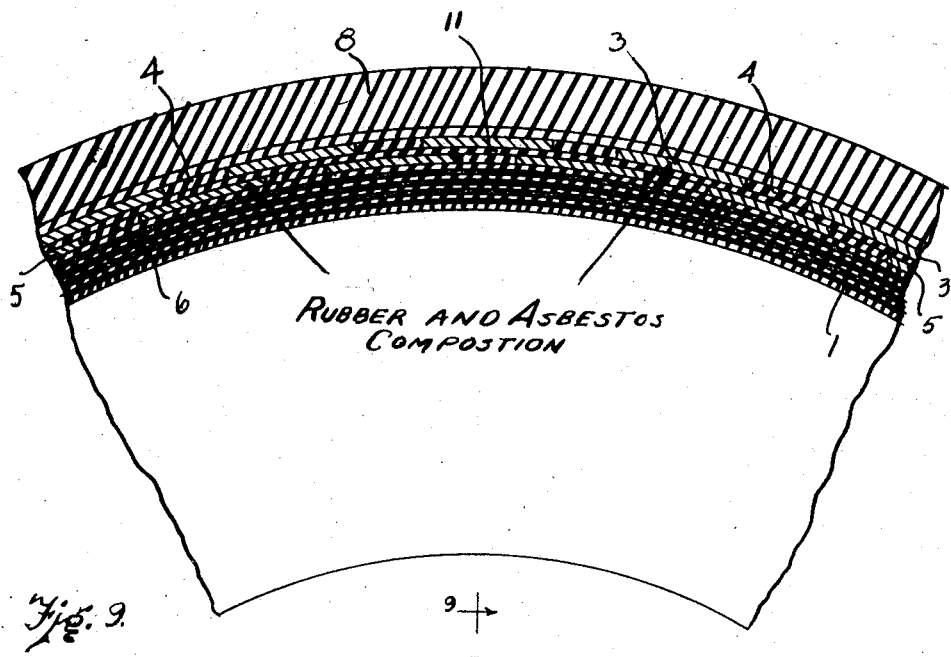
Fig. 9 is a section taken on line 9—9 of Fig. 8.
Figure 8:
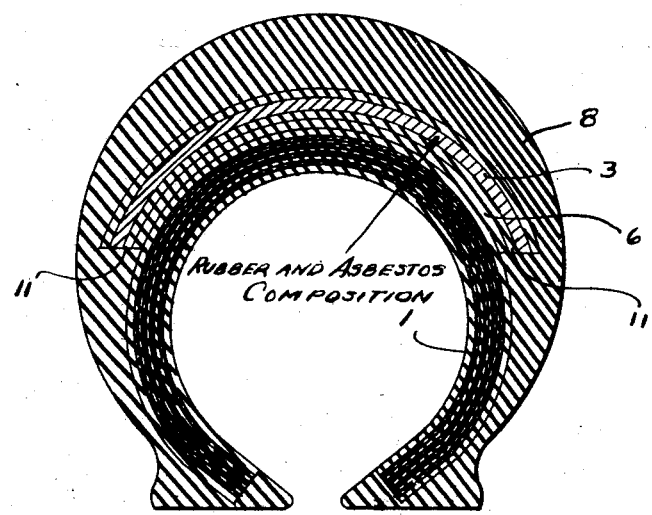
Fig. 8 is a section showing an alternative type of casing.

In manufacture the base of the tire is built up on a form and comprises strips of strengthening material of any approved form which are laid at different angles over the form as shown in Fig. 7, the material in one layer extending in one direction and the material in the next layer extending in the opposite direction. These layers 1 are separated by layers of raw rubber until several layers are built up. The next portion of the tire comprises a base 2 of the usual strengthening material having rubber on each side thereof and the plates 3 are positioned at equal intervals along the outer side thereof, the spaces between the plates being filled in with suitable material, preferably rubber, indicated at 4. Similar plates 5 are positioned on the inner side of the base 2 in spaced relation and in staggered relation with the plates 3, the edges of the plates 3 and 5 overlapping as shown, and the spaces between the plates being filled with rubber indicated at 6. These plates 3 and 5 as shown in Fig. 1, are arcuate in cross section and may be made of rubber and asbestos composition. In Figs. 3, 4, 5, and 6, it will be seen that a series of wires 10 are embedded in this composition and in these views the size of the wire is exaggerated to some extent. As shown more particularly in Figs. 4 and 6 there is a series of rows of wires 10 extending in the same general direction in each vulcanizable plate and the wires of one row are in alignment with the spaces between wires of adjacent rows so that a puncturing instrument entering the plate would, should it happen to pass the wires of the first row, be guided by those wires to engagement with a wire of a succeeding row and thus deflect it before reaching the interior of the casing. As shown in Fig. 5 the wires in the different layers may extend at different angles if desired to further strengthen the plates. When the rubber and asbestos composition is used the material is placed in a form in which pressure is applied to the material and the material with the wires therein is vulcanized until the plates become sufficiently hard to resist puncture but are not allowed to become sufficiently hard as to lose their flexibility. The wires 10 reinforce the plates and hold the mass together and at the same time tend to hold the plates in a correct arcuate form. When these plates have been positioned in the casing as shown the portion of the casing containing the plates is positioned over the portion 1 of the casing and this portion of the casing is covered with alternate layers 7 of strengthening material (which may be of any well known type) and rubber, and the rubber tread 8 is positioned thereover containing the cable bases 9. The entire casing is then vulcanized so that all the parts form an integral portion of the casing and the plates 3 and 5 being formed of a vulcanizable composition become a part of the tire and being flexible they cannot break away from the adjacent portions of the casing and cut the tire which would occur if the plates were made of a non-vulcanizable material. As shown in Figs. 3, 4, 5, and 6, the wires 10 may be coated with a heat resisting substance indicated by the heavy black portion around the wires 10 so that the wires may be vulcanized in position in the mass and cannot break loose. With some compositions adaptable for use as the material for the plates, the wires may be coated with heat resisting vulcanizable insulation preferably consisting of asbestos and rubber. The wires are then placed in the composition of which the plates are composed and the composition is put under heavy pressure, the composition being coated with rubber and being vulcanized to the desired extent. Both sides of the plate are preferably provided with depressions as shown in Figs. 3 and 5 so that in the final vulcanizing process, the adjacent surfaces of the plates and surrounding rubber of the tire carcass will readily vulcanize together. In Figs. 8 and 9 a more simple construction is shown in which the layers of material 7 are done away with and the plates 3 and 5 are spaced by a layer of rubber 11 doing away with the fabric base 2. While this construction does not produce quite as strong a casing it will be found very satisfactory for all normal uses.

The structure of a tire disclosed in this application differs from that disclosed in my U. S. Patent 1,482,217 issued January 29, 1924, particularly in the manner in which the puncture resisting elements are arranged relative to the strengthening material.

From the foregoing description it becomes evident that the device is very simple and efficient in operation, is practically puncture proof due to the overlapping of the plates and the staggered arrangement of the wires 10 therein and has all of the resiliency and flexibility of the normal casing due to the breaking of the joints between the plates in alternate relation and due to the flexible resilient material between the plates and provides a device which accomplishes the objects described.

Having thus fully described my invention, its utility and mode of operation, what I claim and desire to secure by Letters Patent of the United States is—

1. A casing for pneumatic tubes comprising a series of puncture resisting plates of vulcanizable material embedded in the casing, a series of reinforcing wires coated with a heat resisting substance and extending through the said plates, the wires being arranged in the plates in crossed layers at an angle to the center plane of the casing and in staggered relation to prevent the possibility of puncture, the casing being vulcanized to secure the plates in position.

2. A casing for pneumatic tubes comprising a series of puncture resisting plates of vulcanizable material embedded in the casing, a series of reinforcing wires extending through the plates at an angle to the center plane of the casing, the wires being arranged in the plates in layers in angular relation one to the other and in staggered relation, a series of alternate layers of rubber and fabric on opposite sides of the plates, a tread on the exterior of the casing thus formed, the entire casing and tread being vulcanized to secure the parts together.

3. A casing for pneumatic tubes comprising a series of puncture resisting plates of a vulcanizable material with which asbestos is associated, the said plates lying in two series in overlapping relation, the spaces between the plates, being filled with vulcanizable material and a strengthening material, reinforcing members embedded in said plates at an angle to the center plane of the casing, a series of layers of strengthening material and rubber supporting the plates, and a rubber tread covering the casing thus formed, the said casing being vulcanized to secure the plates in position as an integral portion of the casing.

4. A casing for pneumatic tubes comprising a series of alternate layers of rubber and strengthening material, a series of puncture resisting plates of vulcanizable material spaced equidistantly about the periphery of the casing, a series of reinforcing wires embedded in the plates extending at an angle to the center plane of the casing, a vulcanizable filling between the plates, a layer of rubber positioned over the plates, a layer of strengthening material enclosing the rubber, a second layer of rubber enclosing the strengthening material, a second series of puncture resisting plates of vulcanizable material spaced equidistantly about the periphery of the second layer of rubber, reinforcing wires embedded in the said second series of plates extending at an angle to the center plane of the casing, a vulcanizable composition between the plates, a series of alternate layers of rubber and strengthening material covering the two series of plates, and a rubber tread forming a cover for the casing, the entire casing when assembled being vulcanized to secure the several parts together as a unit.

In testimony whereof, I sign this specification.

AMEL B. BROLUSKA.